United States Patent [19]

Henein et al.

[11] Patent Number: 5,123,279
[45] Date of Patent: Jun. 23, 1992

[54] TRANSDUCER FOR AN ELECTROMOTIVELY DRIVEN POWER STEERING SYSTEM

[75] Inventors: Nabil Henein, Darmstadt; Wilhelm Beer, Ruesselsheim; Juergen Balz, Wiesbaden, all of Fed. Rep. of Germany

[73] Assignee: Alfred Teves GmbH, Frankfurt am Main, Fed. Rep. of Germany

[21] Appl. No.: 683,405

[22] Filed: Apr. 10, 1991

[30] Foreign Application Priority Data

Apr. 19, 1990 [DE] Fed. Rep. of Germany ....... 4012480

[51] Int. Cl.$^5$ ............................................ G01M 19/00
[52] U.S. Cl. ................................................... 73/118.1
[58] Field of Search ............... 73/118.1; 180/146, 150, 180/142

[56] References Cited

U.S. PATENT DOCUMENTS 4,924,696  5/1990  Schroeder et al. ................. 73/118.1
5,020,616  6/1991  Yagi et al. ...................... 73/118.1 X

*Primary Examiner*—Jerry W. Myracle
*Attorney, Agent, or Firm*—Robert P. Seitter; J. Gordon Lewis

[57] ABSTRACT

A transducer for an electromotively driven automotive vehicle power steering system is substantially composed of a compact sensor carrier (6) which can be plugged into a corresponding opening of a steering housing (1). Semiconductor sensor elements (S1, S2) are arranged on the side of the sensor carrier (6) projecting into the interior of the steering housing (1). Outwardly, the sensor carrier (6) ends in plug contacts (12) serving to supply the sensor signals via a corresponding counter-plug to the analyzing electronics. The compact transducer which is retained in the steering housing (1) e.g. by means of steel stop springs (13) is apt for measuring the steering angle, the steering velocity and steering acceleration as well as for measuring the steering torque.

12 Claims, 1 Drawing Sheet

TRANSDUCER FOR AN ELECTROMOTIVELY DRIVEN POWER STEERING SYSTEM

INTRODUCTION

The present invention relates to a transducer for an electromotively driven automotive vehicle power steering system comprising a steering housing in which a travel generator is accomodated having a sleeve which is arranged on a rotor coaxially to a torsion bar, the sleeve being axially displaceable proportionally to the occurring steering torque.

BACKGROUND OF THE INVENTION

An electric power steering system having a complicated measuring system is known already from German published patent application 36 17 772 C2.

BRIEF DESCRIPTION OF THE INVENTION

An object of the present invention is, therefore to devise a comparatively simple, low-cost and compact transducer which permits to reliably determine the steering angle, the steering velocity and derivable quantities such as steering acceleration etc.

It has proven now that this object can be achieved by the transducer described in claim 1. Further important advantageous embodiments of such a transducer are defined in the subclaims.

Further features, advantages and possibilities of application of the present invention can be taken from the following description with reference to the accompanying drawing showing an embodiment of this invention.

DETAILED DESCRIPTION OF THE PRESENT INVENTION

Figure 1:
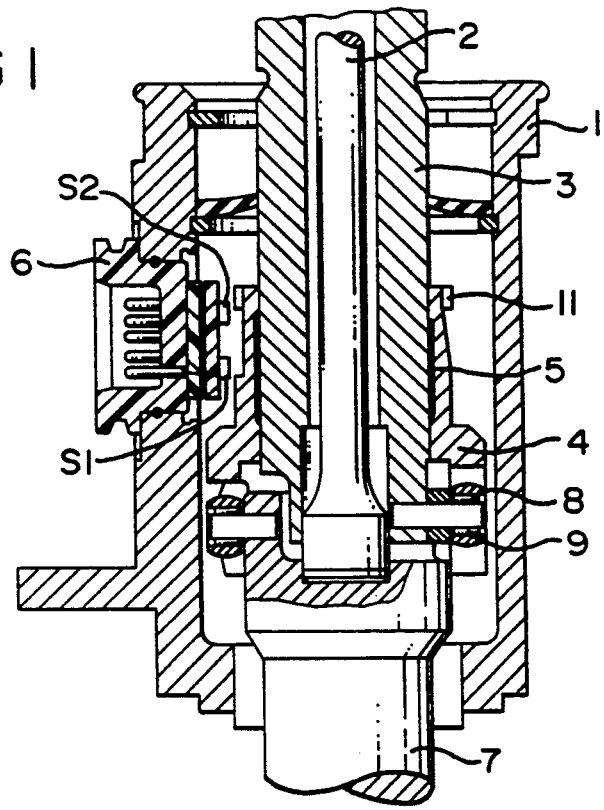
FIG. 1, is a longitudinal cross-sectional view of that part of a steering housing which incorporates a transducer according to this invention.

FIG. 1 displays a steering housing 1 for a power steering system with a-non-illustrated-electromotive drive. Projecting into this steering housing is a torsion rod 2 of the power steering system onto which the rotary motion of a steering wheel is transmitted in a known fashion. The torsion rod 2 is seated in a coaxially arranged rotor 3 onto which the rotary motion of the steering wheel is transmitted as well, which, however, in doing so is twisted in relation to the rotor 3 in dependence on the generated steering torque. The relative rotary motion between the torsion rod 2 and the rotor 3 is converted into an axial displacing motion by way of a travel generator or flag. The travel generator is substantially composed of a sleeve 4 which is axially displaced in a known manner by means of an oblique edge, as is indicated in FIG. 1, during a relative rotary motion between the rotor 3 and the torsion rod 2. A signal is produced in a semiconductor sensor element S2, which is mounted on a plug-in sensor carrier 6, by means of a control edge or a cone 5 when this axial displacement is performed.

In the embodiment displayed in FIG. 1, the rotary motion of the torsion rod 2 caused on steering of the vehicle is supplied further in a known fashion via a steering pinion 7 only partly illustrated. The rotor 3 and the steering pinion 7 respectively the shaft leading to the steering pinion are herein connected via a needle bearing 8 with a bearing housing 9.

What is of essence for this invention is the arrangement and the design of the transducer, namely the sensor carrier 6 with the semiconductor sensor elements S1 and S2. The sensor elements are for instance magneto resistors or Hall generators. In the embodiment shown, the sensor element S2 in conjunction with a toothed rim 11, the latter being arranged on the sleeve 45 or on the rotor 3 and rotating synchronously with the torsion rod 2, serves to measure the steering angle, the direction of rotation, the steering velocity and —derivable therefrom—the steering acceleration. The sensor element S1 generates a signal responsive to the axial displacing motion of the sleeve 4 and thus to the generated steering torque. Via non-illustrated or only indicated lines in the interior of the transducer, the semiconductor sensor elements S1 and S2 are coupled to plug contacts 12 through which the electric measurement signals can be supplied further for analysis. A cable can also be connected instead of this plug assembly or, respectively, these plug contacts 12.

Expediently, the semiconductor sensor elements S1, S2 are provided twice in order to be able to generate redundant signals for monitoring the system and to deliver them via contacts further for analysis.

Figure 2:
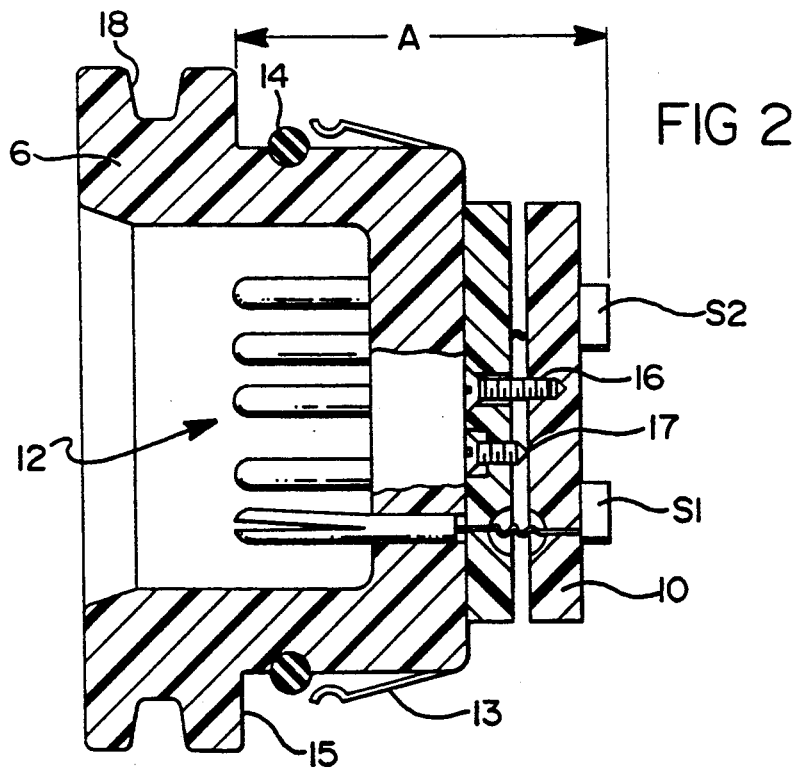
FIG. 2, is an enlarged view of the transducer according to FIG. 1.

The transducer which is shown entirely in FIG. 2 is attached in the corresponding opening of the steering housing 1 by means of a quick-connect. Serving as a quick-connect in the illustrated embodiment is an arrangement comprising several steel stop springs 13 which, after insertion of the sensor carrier 6 into the steering housing 1, fix the carrier in its illustrated position. If so required, the sensor carrier can be drawn out again without any tools. A circumferential seal 14 isolates the interior of the steering housing 1 from the external surface.

The sensor elements S1 and S2 are adjusted prior to the insertion of the inventive transducer. For this purpose, a stop edge 15 is provided on the sensor carrier 6 serving as a point of reference for the measure A which defines the position respectively the depth of the sensors S1, S2 in the interior of the steering housing 1. To adjust this measure or distance A, a carrier plate 10 on which the sensor elements S1, S2 are seated is attached to the sensor carrier 6 by virtue of setscrews and fastening screws 16, 17.

A circumferential notch 18 on the external side of the sensor carrier 6 serves to fix a counter-plug not shown which receives the contacts 12 and establishes a connection to the electronics which is likewise not shown.

As can be taken from the preceding description, the inventive transducer distinguishes among others by an especially compact design. A number of sensor elements, e.g. two or four, which may belong to different sensor systems can be accommodated in a very small space. The assembly and disassembly of the externally mounted, completely manufactured and adjusted transducer is extermely simple. The actual sensor elements S1, S2 can be embedded in plastic as a protection. The opening of the steering housing is closed entirely by the inventive sensor carrier.

What is claimed is:

1. A transducer for an electromotively driven automotive vehicle power steering system comprising: a steering housing; a travel generator disposed within said housing and including a sleeve carried on a rotor coaxially to a torsion bar, said sleeve axially displaceable in response to operator applied steering torque, wherein said transducer is fitted into an opening of the steering housing, is retained therein by quick-connect means, and includes at least one semiconductor sensor element on a surface thereof that is directed to the interior of the steering housing towards the sleeve, while an outwardly directed side of the transducer is provided with interface means for interconnecting the semiconductor sensor element to an electronic control circuit.

2. The transducer as claimed in claim 1, wherein the semiconductor sensor element is operative to measure angle of rotation as well as direction of rotation of the torsion bar and for measuring steering torque.

3. The transducer as claimed in claim 2, wherein the semiconductor sensor element for measuring the angle of rotation determines the rotary motion of a pulse-generator toothed rim carried by the rotor.

4. The transducer as claimed in claim 2, wherein the semiconductor sensor element determines axial displacing motion of the sleeve for measuring the steering torque.

5. The transducer as claimed in claim 1, wherein the semiconductor sensor element is operative for redundant measurement of the angle of rotation as well as the direction of rotation and the axial displacing motion of the sleeve.

6. The transducer as claimed in claim 1, wherein magneto resistors are provided as said at least one semiconductor sensor element.

7. The transducer as claimed in claim 1, wherein said interface means comprises plug contacts.

8. The transducer as claimed in claim 1, wherein said quick connect means comprise steel stop springs attached to the transducer operative to engage the housing when inserted thereinto.

9. The transducer as claimed in claim 1, wherein the semiconductor sensor element is adjustably mounted in the direction of insertion on a carrier plate, and in that an insertable sensor carrier comprises a stop edge which establishes a characteristic mounting depth.

10. The transducer as claimed in claim 1, wherein said at least one sensor element comprises a Hall generator.

11. A transducer for an electromotively driven automotive vehicle power steering system including an input shaft for receiving operator applied torque, an output shaft disposed generally coaxially with said input shaft and adapted for operatively engaging a load, a flag member operatively coupled between said shafts for selective positioning in resonse to relative rotational displacement of said shafts and a housing operative to retain said shafts in an axially fixed relationship, said transducer comprising:

a body member supportively received within an opening defined by said housing;

a plate member carried by said body member radially intermediate said body member and said flag member and in general registry therewith;

externally accessible electrical interface means;

at least one sensor element carried by said plate member in radially outwardly spaced proximity of said flag member and electrically in-circuit with said interface means whereby the positioning of said flag member takes place at least in part within a sensing region of said sensor, which, in turn, generates an output signal in response thereto;

quick connect means carried by said body member for retentive engagement with said housing; and externally accessble adjustment means operative to selectivity radially reposition said plate member and sensor element for precise alignment with said flag member.

12. A transducer for an electromotively driven automotive vehicle power steering system including an input shaft for receiving operator applied torque, an output shaft disposed generally coaxially with said input shaft and adapted for operatively engaging a load, a flag member operatively coupled between said shafts for selective positioning in response to relative rotational displacement of said shafts and a housing operative to retain said shafts in an axially fixed relationship, said transducer comprising:

a body supportively received within an opening defined by said housing in general registry with said flag member;

externally accessible electrical interface means; and at least one sensor element carried by said body in radially outwardly spaced promixity of said flag member and electrically in-circuit with said interface means whereby the positioning of said member takes place at lest in part within a sensing region of said sensor, which, in turn, generates an output signal in response thereto; and quick connect means carried by said body for retentive engagement with said housing.

* * * * *